United States Patent Office 2,963,162
Patented Dec. 6, 1960

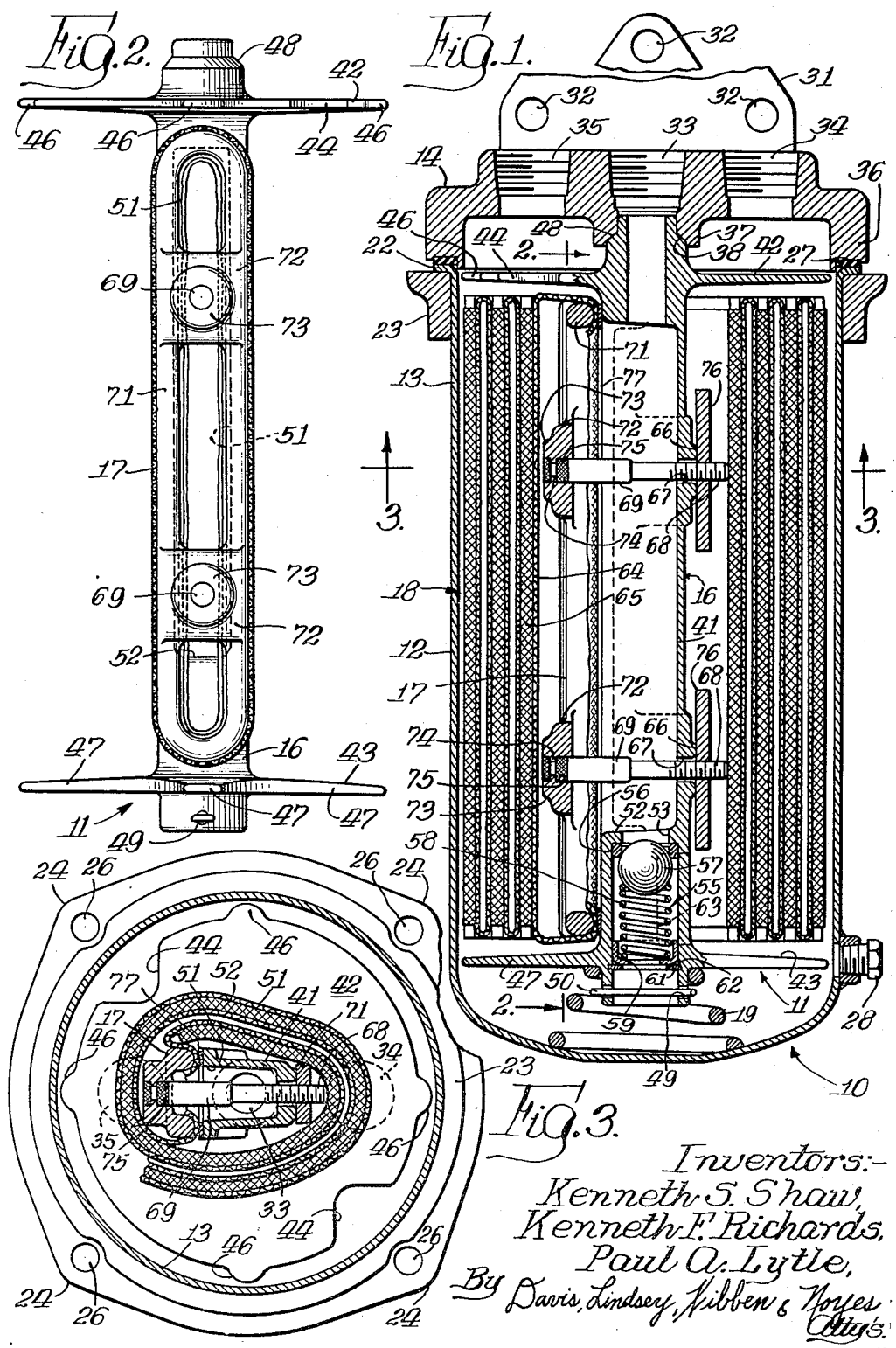

2,963,162

OIL FILTER SPOOL CONSTRUCTION

Kenneth S. Shaw, Kenneth F. Richards, and Paul A. Lytle, Columbus, Ind., assignors to Cummins Engine Company, Inc., Columbus, Ind., a corporation of Indiana Filed July 22, 1959, Ser. No. 828,819

4 Claims. (Cl. 210—487)

This invention relates to filters, and more particularly to an improved spool construction for supporting a filter element in the container of a pressure oil filter.

It is therefore an object of the invention to provide an improved oil filter construction.

A further object of the invention is to provide an improved spool construction for supporting a wrap-around bag type filter element in the container of a lubricating oil filter.

Another object of the invention is to provide an improved spool construction for supporting a wrap-around bag-type filter element in the container of a pressure oil filter that has a minimum number of parts, is simple in construction, and permits easy replacement of the bag.

Other objects and advantages of the invention will become apparent upon making reference to the following detailed description and accompanying sheet of drawings, in which;

Fig. 1 is a longitudinal sectional view of an oil filter employing a filter element supporting spool embodying the present invention;

Fig. 2 is an elevational view, with some parts in section, of the spool construction shown in Fig. 1 and taken on the line 2—2 of Fig. 1; and Fig. 3 is a sectional view taken along the line 3—3 of Fig. 1.

Briefly described, the present invention contemplates an improved spool construction for supporting a wrap-around bag-type filtering element in the container of a filter, the filter in this instance being of the pressure type for filtering lubricating oil such as is used in an internal combustion engine. The spool construction to be hereinafter described permits rapid installation or removal of the filter element from the spool, and a positive, fluid pressure sealed connection therewith when in use. To this end, only two major parts make up the spool construction of the present invention, namely the spool proper and a clamp for detachably securing the filter element to the spool. To minimize the number of parts, the clamp includes a pair of threaded securing elements which avoid the possibility of misalignment during assembly of the clamp with the spool.

In Fig. 1 a lubricating oil filter 10 is illustrated, employing a spool embodying the features of the present invention. The filter 10 generally comprises a container 12 which includes a shell or can 13, a cap 14, and a spool assembly 11. The latter includes a spool 16, a clamp 17, and a filter element 18 secured to the spool 16 by the clamp 17. The spool 16 is resiliently supported at its lower end in the shell 13 by spring means 19 which also urges the upper end of the spool 16 into engagement with the cap 14.

The shell or can 13 comprises a deep cylindrical cup having an annular radial flange 22 around its upper end for engagement with a mounting ring or support 23. As shown in Fig. 3, the mounting ring 23 may be provided with four radially enlarged portions 24 which are longitudinally bored as at 26 for receiving mounting bolts (not shown) to secure the cap 14 to the shell 13. A gasket 27 may be interposed between the cap 14 and the flange 22 to provide a fluid pressure seal therebetween. The shell 13 may also be provided with a drain plug 28 at its lower end.

The cap 14 includes a vertically disposed mounting flange or pad 31 having a plurality of holes 32 therethrough for mounting the filter 10. To provide for the entry and exit of lubricating oil from the filter 10, the cap 14 includes a central longitudinal inlet opening 33 and a pair of radially spaced outlet openings 34 and 35. Only one of the outlet openings 34 or 35 need be used at any one time. The inner face of the cap 14 is provided with a downwardly extending circumferential flange 36 for engagement with the gasket 27, and a somewhat shorter downwardly extending annular boss 37. The boss 37 is counterbored as at 38 for engagement with the complementally shaped upper end of the spool 16 to provide a fluid pressure joint therebetween.

The spool 16 comprises a tubular body member 41 having a pair of annular radial flanges carried adjacent the upper and lower ends thereof, the upper and lower flanges being indicated at 42 and 43, respectively. In this instance, the flanges 42 and 43 are formed integrally with the body member 41. The upper flange member 42 is generally disc-shaped (Fig. 3), and is provided with a pair of diametrically opposed V-shaped notches 44 and four circumferentially spaced radially outwardly extending projections or lugs 46 which serve to engage the inner wall of the container shell 13 and center the spool assembly 11 therein. The notches 44 accommodate passage of lubricating oil upwardly to either or both of the outlet openings 34 or 35. The lower flange 43 comprises four circumferentially spaced radially extending tapered arms 47 which define open areas therebetween and thus permit settling of minute metal particles and other foreign matter to the bottom of the container shell 14. The outer ends of the arms 47 perform a centering function for the lower end of the spool assembly 11.

The tubular body member 41 extends above and below the flanges 42 and 43, the upper end being tapered inwardly as at 48 for pressure sealed engagement with the counterbored portion 38 (Fig. 1) of the cap 14. The lower projecting end of the body member 41 is diametrically bored as at 49 to receive a pin 50 to retain the compression spring 19 thereon. The body member 41 preferably has a somewhat rectangular cross section and includes a longitudinal elongated slot or opening 51 which generally extends between the upper and lower flanges 42 and 43 in the side thereof, the opening 51 being terminated at its lower end, somewhat above the lower flange 43 by a transverse wall 52 within the body member 41.

The wall 52 is centrally bored as at 53 to define a by-pass flow passage directly through the body 41 and thus around the filter element 18, the passage being normally closed by a spring biased check valve assembly 55. The check valve assembly 55 comprises a ring member 56 which bears against the lower side face of the wall 52 and around the opening 53 to provide a seat for a ball 57 which is biased into sealing engagement with the ring 56 by a coil spring 58. The lower end of the coil spring 58 is seated in a apertured cup 59 retained in the lower end of the body member 41 by a snap ring 61 which seats in an annular internal groove 62 in the lower end of the body member 41. Inasmuch as the snap ring 61 and cup member 59 are centrally open, a portion of the by-pass flow around the check valve assembly 55 will pass directly through the body member 41 and thence to the lower end of the container 13. In order to provide for additional flow through the check valve assembly 55, a second pair of ports 63 (Fig. 1) are provided in the side wall of the body member 41 below the wall 52 and opening at their lower ends into a space between the filter element 18 and lower flange 43. When the ball 57 is unseated, such as when the filter element 18 becomes clogged, lubricating oil may flow directly through the body member 41, as well as through ports 63, around the filter element 18 and upwardly to either of the outlet openings 34 or 35. Thus, a flow of lubricating oil to the engine is assured at all times.

The filter element 18 comprises an elongated rectangularly shaped porous bag member 64 preferably made of cloth and having an open end adapted to be clamped around the opening 51 so that oil may flow out through the opening 51 and into the bag and foreign particles entrained in the oil passing through the filter 10 will be trapped in the bag as the oil passes through the pores thereof. The bag member 64 is secured around the opening 51 by the clamp 17 in such a manner that the oil enters the bag, and the bag is then wrapped around the body member 41 of the spool 16. A length of corrugated screen mesh 65 is wrapped between adjacent turns of the bag member 64 to maintain them in spaced relation and to permit filtering throughout the full length of the bag 64.

For securing the clamp 17 to the body member 41, the latter is provided with a pair of longitudinally spaced bosses or pads 66 (Fig. 1) in the side wall thereof opposite the opening 51, the pads 66 being radially bored as at 67 to receive the end portions 68 of a pair of longitudinally spaced securing elements 69 mounted at one end in the clamp 17 and extending transversely therefrom.

The clamp member 17 (Fig. 2) preferably comprises an elongated oval-shaped frame 71 having a length and width sufficient to perimetrically enclose the opening 51 in the side wall of the body member 41, the frame 71 including a pair of longitudinally spaced webs 72 extending transversely between the sides of the frame. Open areas registering with the opening 51 are thus defined by the frame 71 when the clamp member 17 is engaged with the body member 41. The webs 72 are thickened as at 73 to provide bosses for receiving the ends of the securing elements 69.

The securing elements 69 preferably comprise elongated studs which are permanently secured to the webs 72 in a manner such that the studs 69 become an integral part of the clamp 17. To this end, the frame-engaging ends of the studs 69 are provided with an annular circumferential groove 74 and have their peripheral surfaces adjacent each side of the groove 74 roughened or knurled, as at 75, to provide an interlocking engagement with the webs 72. The frame 71 is preferably cast around the studs 69 so that the latter become a permanent and integral part of the clamp 17. The studs 69 are sufficiently long so that their ends 68 extend through the body member 41 and bores 67 and are threaded to receive threaded members, in this instance bars 76, which, upon engagement with the ends 68, bear against the body member 41 and serve to draw the clamp 17 tightly against the body member 41 and around the openings 51. A gasket 77 is preferably interposed between the surface of the body member 41 around the opening 51 and the frame 71 to tightly secure the marginal portions of the bag member 64 when the parts are engaged. The bag member 64 is engaged with the clamp 17 by inserting the frame portion 71 thereof into the open end of the bag 64 and wrapping the marginal end portion thereof inwardly around the frame 71.

In operation, the filter element 18, which consists of the bag 64 and corrugated screen mesh spacer 65, is secured to the spool 16 by clamping the open end of the bag 64 around the opening 51 and thereafter wrapping the bag 64 and screen mesh 65 around the body member 41 of the spool 16 as shown in Fig. 3. After the filter element 18 has been wrapped fully around the spool 16, the latter is inserted into the container 12 and the cap 14 secured thereto. Lubricating oil or other fluid to be filtered flows centrally through the spool 16, outwardly through the opening 51, into the bag 64 and through the walls thereof, and thence upwardly around the filter element 18 and through either of the outlets 34 or 35. Should the filter element 18 become clogged or otherwise inoperative, fluid pressure will unseat the ball 57 to permit a by-pass flow of the fluid through the ports 63 and the lower open end of the spool 16 directly to the outlets 34 or 35.

We claim:

1. A spool construction for supporting a filter element in the form of an elongated bag having one end open, said spool construction comprising a tubular member having an elongated longitudinally extending opening in the side thereof, and a clamp member for clamping the open end of said bag around said opening and comprising an elongated frame adapted to be inserted in the open end of the bag with the marginal portion of the bag turned inwardly within the frame, said clamp member having at least one web extending transversely between the sides of the frame and provided with a rigidly mounted elongated securing element extending through said tubular member and having a member threaded thereon and bearing against said tubular member to draw said clamp member against said tubular member and thereby clamp the marginal portion of the bag therebetween with said opening communicating with the interior of the bag.

2. A filter spool construction according to claim 1, in which said clamp member is one-piece and said securing element has one end rigidly secured in said web.

3. A filter spool according to claim 2, in which said one end of said securing element is roughened to hold the securing element rigidly in said web.

4. A filter spool according to claim 3, in which said one end has a circumferential groove therein and said clamp member engages in said groove to interlock said stud with said web.

No references cited.